Dec. 4, 1951    C. BOSCH    2,577,446
ELECTROSTATIC VOLTAGE GENERATOR
Filed Aug. 5, 1950    2 SHEETS—SHEET 1
FIG. I
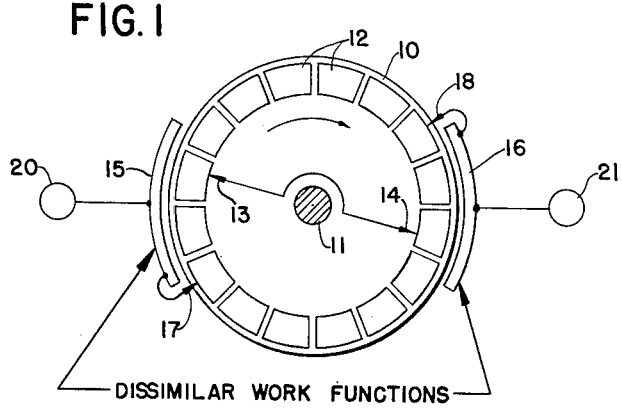
—DISSIMILAR WORK FUNCTIONS—
FIG. 2
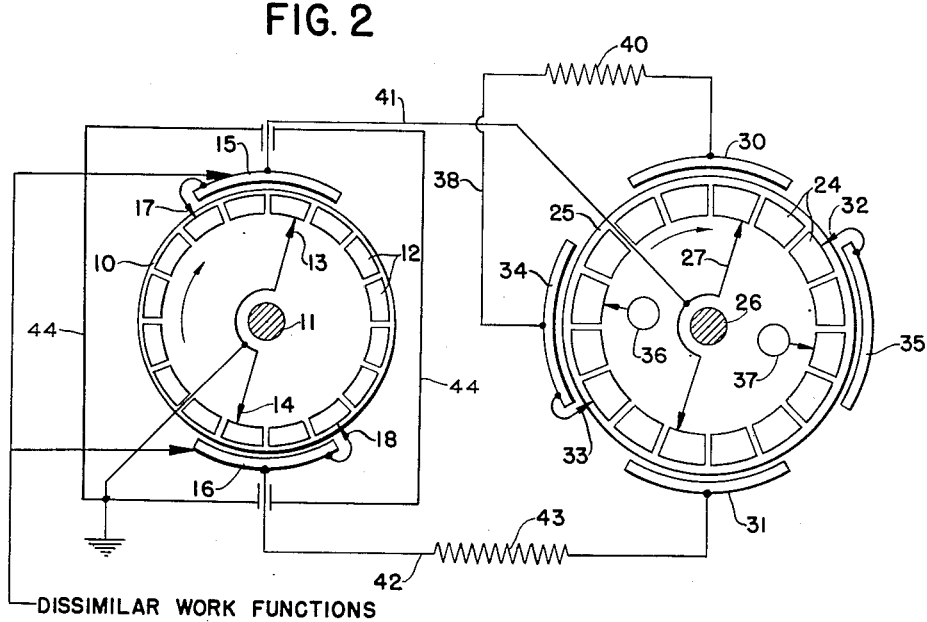
—DISSIMILAR WORK FUNCTIONS
*Carl Bosch*
INVENTOR.

Dec. 4, 1951 C. BOSCH 2,577,446
ELECTROSTATIC VOLTAGE GENERATOR
Filed Aug. 5, 1950 2 SHEETS—SHEET 2

DISSIMILAR WORK FUNCTIONS

DISSIMILAR WORK FUNCTIONS

DISSIMILAR WORK FUNCTIONS

*INVENTOR.*
CARL BOSCH
BY *Ralph E. Bitner*
ATTORNEY

Patented Dec. 4, 1951

2,577,446

UNITED STATES PATENT OFFICE 2,577,446

ELECTROSTATIC VOLTAGE GENERATOR

Carl Bosch, Westfield, N. J., assignor to Chatham Electronics Corporation, Newark, N. J., a corporation of New Jersey Application August 5, 1950, Serial No. 177,838

9 Claims. (Cl. 171—329)

This invention relates to voltage generators of the electrostatic influence type, and has particular reference to the method and means for starting the voltage generation with a predetermined polarity.

Influence generators are not self-starting because their generating action depends upon an electrical field between two inductor plates. If no field exists no voltage will be generated. In prior art machines it has been the practice to create a field by placing a small charge on one of the plates. A charge for this purpose may be derived from a small battery or from some action which produces an electrical charge by friction. Both these methods of starting are inconvenient and not reliable.

It is the purpose of this invention to disclose a voltage generator which is self-starting and may be used as a self-contained voltage source or may be used as a charger for another induction generator.

One of the objects of this invention, therefore, is to provide an improved electrostatic induction generator which is self-starting without the aid of external charging means.

Another object of the invention is to determine the polarity of an electrostatic generator and to insure that it will always start in the same manner.

Another object of the invention is to enable induction type generators to be self-starting without the addition of expensive elements or friction producing mechanisms.

The invention comprises a self-starting voltage generator of the influence type and includes a rotatable insulator disk having conducting sectors mounted thereon. Two induction plates are mounted adjacent to the disk so that a field between them will include some of the conducting sectors. One of the induction plates is made of a material which has a work function which differs from the work function of the sectors. A diametral conductor with contact brushes connects two opposite sectors while they are in the electric field between the two stator plates and breaks this connection as the sectors leave the field. Two connecting brushes are provided, one for each induction plate, to transfer the voltage from the sectors to the plates.

For a better understanding of the present invention, together with other and further objects thereof, reference is made to the following description taken in connection with the accompanying drawings.

Fig. 1 is a schematic diagram of an influence type generator with a self-starting arrangement.

Fig. 2 is a schematic diagram of a conventional electrostatic influence generator with a self-starting generator used as a charger.

Figure 3:
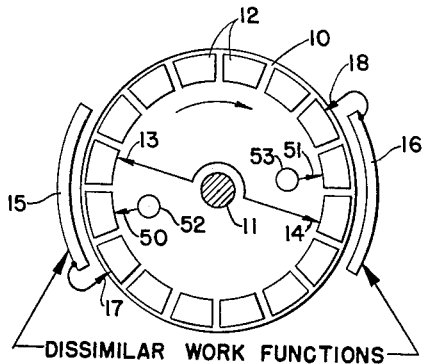
Fig. 3 is similar to Fig. 1 but has two additional brushes which are connected to output terminals.

Referring now to Fig. 1, a self-starting influence generator is illustrated schematically. An insulated disk 10 is secured to a shaft 11 which is suitably journaled for operative rotation. The shaft and rotor may be turned by manual means or a suitable motor may be employed. A plurality of conducting sectors 12 are secured to the disk near or at its periphery and are insulated from each other. A diametral conductor terminated by brushes 13 and 14 is secured to an insulated stationary member and is adjusted so that the brushes make contact with each sector as it is rotated by the brush position. Also mounted on stationary non-conducting supports are two influence plates 15, 16, which are positioned on opposite sides of the disk 10 with their surfaces closely adjacent to the sectors 12. The drawing shows these plates in a conventional representation; actually, an efficient machine employs flat plates mounted parallel to the flat surfaces of the disk.

In order to collect the generated charges from the rotating sectors collector brushes 17, 18 are employed. These brushes are connected to the stator influence plates 15, 16 and make contact with the sectors as they pass into the electric field of the two plates. Terminals 20, 21 are connected to the influence plates and can be used to supply high voltage electrical power to an external circuit.

To provide the self-starting characteristic, one of the stator plates 15 is made of aluminium while the rotating sectors 12 are made of brass or copper. Other combinations of metals may be used, the only requirement being that the metals have different work functions. The work function of a conductor may be defined as the minimum energy that must be imparted to an electron before it can be emitted from the surface of the conductor. The work function is generally expressed in electron volts or simply "volts." When two conductors having different work functions are connected together, an electric field is produced between the free ends, the value of the field in volts being equal to the difference between the two work functions. This value is called the contact potential. For a more detailed explanation of the above subject see "Industrial Electronics Reference Book," published by John Wiley 1948, pages 10 to 13, inclusive.

If the stator plate 15 is made of aluminium having a work function of about 3.0 volts and the sectors are made of brass having a work function of about 4.2 volts, then by joining them by means of brush 17 and the brush conductor, an electric field of 1.2 volts is produced between the stator plate and the sector. When the sector moves out of contact with brush 17 an electric charge is retained by it, the value of which depends upon the capacitance of the plate-sector combination.

When the charged sector reaches brush 13 which is connected to the diametral conductor and brush 14, the charge is divided between the two sectors, making simultaneous contact, and when the two sectors break contact with brushes 13 and 14 and are turned away from stator plates 15 and 16, their potential increases in proportion to the decrease in capacitance. When each sector has made almost half a revolution and reached brushes 18 and 17, respectively, their potential has increased to a value which is many times the starting value of 1.2 volts and thereafter the operation is practically independent of the contact potential used to start the voltage generation.

The gradual build-up of potential on stator plates 15 and 16 follows the usual procedure present in most static generators. When the sectors are connected by the diametral conductor they are charged by induction or influence because they lie between two charged stator plates. When disconnected from the diametral conductor they retain their charge since they are still in the electric field and when the sectors are removed from the vicinity of a stator plate having an unlike charge and forced into the vicinity of a stator plate having a like charge the potential is increased many times.

It is obvious that the above described building up process will not work unless there is some initial electric field between the two stator plates to give the sectors their initial charge. The contact potential provided by the dissimilar metals used for one of the stator plates and the sectors is the starting potential which insures that the generator will always start and will always have the same polarity.

The use of a copper conductor between stator plate 15 and brush 17 does not change the operation nor does the use of graphite for brush 17. The various contact potentials introduced in the circuit because of dissimilar elements as components cancel out and leave only the contact potential between the end materials to form an electric field.

It has been found that the generator of Fig. 1 is reliable only when there is no insulator between the stator plate 15 and the sectors 12. Enclosing either of these elements in an insulating shield produces faulty and changeable fields which vary considerably with temperature and are always subject to superimposed fields due to electric charges caused by friction.

Since elements 15 and 12 cannot be insulated, the maximum voltage generated cannot be more than a few thousand volts and if greater voltages are desired, an insulated generator is used as shown in Fig. 2 with the self-starting generator used as a charger. In Fig. 2 the left hand machine is the same as the generator shown in Fig. 1 and the right hand machine is a conventional high voltage generator with sectors 24 enclosed in a good insulating material such as Lucite or Teflon.

The high voltage generator includes a disk 25 mounted on a shaft 26 which is journaled for rotation. A diametral conductor 27 with brushes on each end is employed to make contact with the sectors while they are in an electric field and break contact as they move out of the field. Stator conducting plates 30 and 31 assume the built-up charges that form the main electric field of the generator. Collector brushes 32 and 33 collect the charges from the sectors and charge auxiliary plates 34 and 35. Output terminals 36 and 37 in this machine are connected to the sectors 24 by separate collector brushes to isolate the output circuit as much as possible so that if a breakdown or spark-over should occur it will have very little effect on the remainder of the generator. In order to replenish the main stator plates with a built-up charge a feed back circuit is used. It includes a conductor 38 and a resistor 40.

The output of the charging generator is applied over conductors 41 and 42 to the diametral conductor 27 and stator plate 31. A damping resistor 43 which may have a value of one megohm is included in series with one of the conductors to cut down any unstable oscillations which might otherwise result. A conductive shield 44 encloses the charging generator to protect it from stray electric fields. It is connected to ground.

The operation of the combination circuit of Fig. 2 is similar to the arrangement of Fig. 1. The charger builds up as previously described and produces an electric field between stator plate 31 and the sectors in contact with the lower brush of diametral conductor 27. The sectors assume a charge and carry it to brush 33 and sector plate 34. Plate 34 charges stator plate 30 through the feed-back circuit 38, 40 and the generator is in a condition to continue building up without additional priming.

It has been found by experiment that an unshielded charging generator will produce unstable changes of polarity due to feed-back action from the main generator. The action is as follows: When the charging generator builds up it starts the main generator which in turn builds up and produces a higher voltage and a much stronger static field. The resultant field is strong enough to influence the charging generator and cause it to change polarity. The changed polarity is communicated to the main generator which also changes polarity and then exerts the same influence on the charging generator. This static feed-back action can be eliminated by the use of the grounded shield 44.

Fig. 3 is similar to Fig. 1 except that brushes 50 and 51 have been added to collect charges from the sector plates. Output terminals 52 and 53 are connected to these collector brushes and are used to supply an external load circuit. Connecting the output circuit in this manner isolates it from the generating and feed-back circuits sufficiently so that a short circuit of the output conductors will not change the polarity of the generator nor stop the generating action.

Figure 4:
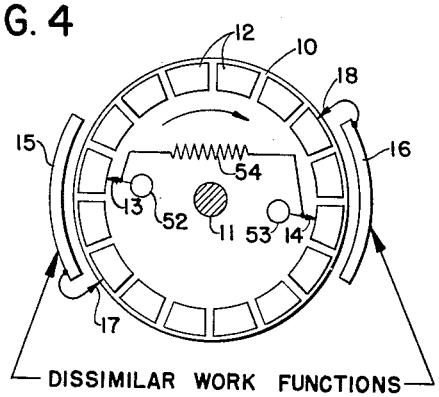
Fig. 4 is also similar to Fig. 1 but has a different output circuit.

Fig. 4 is a simplified circuit similar to Fig. 1 but using a high resistance diametral conductor and taking the output energy from the resistor terminals. In Fig. 4 brushes 13 and 14 operate as collector brushes to transfer charges from the sectors to output terminals 52 and 53. They also cooperate with resistor 54, which may be as high as ten megohms, to isolate charges on the sectors as they pass through the electric field between stator plates 15 and 16.

The generators illustrated in Figs. 3 and 4 are provided with stator plates made of materials having differing work functions similar to the generator illustrated in Fig. 1. This arrangement insures their self-starting characteristic.

Figure 5:
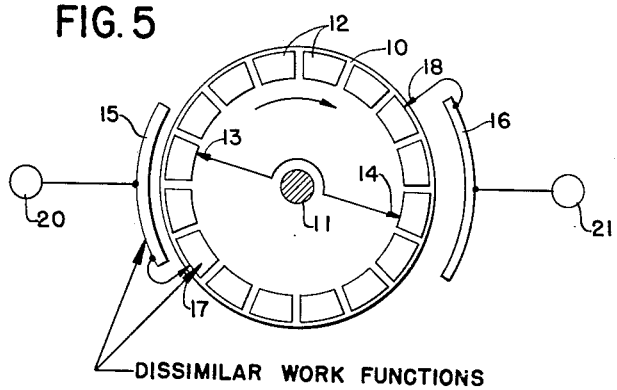
Fig. 5 is the same as Fig. 1 except that the stator plates are set at different distances from the disk.

The generator illustrated in Fig. 5 is similar to Fig. 1 except the spacing of the stator plates is different. In this arrangement both plates 15 and 16 are made of the same conducting material, such as aluminium. The revolving sector plates 12, however, must be made of a material which has a different work function, such as copper or brass. Under ordinary circumstances, with the stator spacings equal there would be no tendency to start the generating action since the electric fields created between the stator plates and the sectors would be equal and opposite. However, stator plate 16 is spaced a substantially greater distance from the rotating sectors than stator plate 15 and, therefore, the strength of field in volts per inch is substantially different in the two fields. Under these circumstances, the charges induced in sectors 12 as they pass plate 15 are greater than the opposite charges induced in the sectors as they pass plate 16. The differential accumulated charge is sufficient to start the feed-back action and the generator builds up in the usual manner.

In practice an electric motor may be coupled only to shaft 26 of the main generator (Fig. 2) and the smaller charger turned by hand for a few turns when it is desired to start the generating action; or the two shafts may be coupled together and both rotated while the main generator is being used.

Frequent and varied tests of the arrangements shown in the drawings have shown that the combination always starts generating as soon as the disks have started to rotate and the polarity is always the same.

While there have been described and illustrated specific embodiments of the invention, it will be obvious that various changes and modifications may be made therein without departing from the field of the invention which should be limited only by the scope of the appended claims.

I claim:

1. An electrostatic voltage generator comprising, a rotatable insulating support, conducting sectors mounted on said support, two stator plates having dissimilar work functions mounted adjacent to the sectors, a diametral conductor having a brush at each end thereof for sequentially connecting opposite sectors as said sectors pass through the electric field between the stator plates, and two collecting brushes, each connected to a stator plate, for collecting electrical charges from the sectors.

2. An electrostatic voltage generator comprising, an insulating disk mounted for rotation, a plurality of conducting sectors secured to the periphery of the disk, two stator plates having dissimilar work functions oppositely mounted adjacent to the sectors, a diametral conductor having a brush at each end thereof for sequentially connecting opposite sectors as said sectors pass through the electric field between the stator plates, and two collecting brushes, each connected to a stator plate, for collecting electrical charges from the sectors.

3. An electrostatic voltage generator comprising, a base member, an insulating disk rotatably mounted on the base, a plurality of conducting sectors secured to the periphery of the disk in spaced arrangement and insulated from each other, two stator plates having dissimilar work functions oppositely mounted adjacent to the sectors, a diametral conductor having a brush at each end thereof for sequentially connecting opposite sectors as said sectors pass through the electric field between the stator plates, and two collecting brushes, each connected to a stator plate, for collecting electrical charges from the sectors.

4. An electrostatic voltage generator comprising, a base member, an insulating disk rotatably mounted on the base, a plurality of conducting sectors secured to the periphery of the disk in spaced arrangement and insulated from each other, two stator plates having dissimilar work functions oppositely mounted adjacent to the sectors, a diametral circuit mounted on the base having a brush at each end thereof for sequentially connecting opposite sectors as said sectors pass through the electric field beween the stator plates, said circuit including a load, and two collecting brushes, each connected to a stator plate, for collecting electrical charges from the sectors.

5. An electrostatic voltage generator comprising, a base member, an insulating disk rotatably mounted on the base, a plurality of conducting sectors secured to the periphery of the disk in spaced arrangement and insulated from each other, two stator plates mounted on the base adjacent to the sectors, said plates made of dissimilar conducting materials with dissimilar work functions for creating an electric field in a portion of the space between the two plates, a diametral conductor mounted on the base having a brush at each end thereof for sequentially connecting opposite sectors as said sectors pass through the electric field, and two collecting brushes, each connected to a stator plate for collecting electrical charges from the sectors.

6. An electrostatic voltage generator comprising, a base member, an insulating disk rotatably mounted on the base, a plurality of conducting sectors secured to the periphery of the disk in spaced arrangement and insulated from each other, two stator plates mounted on the base adjacent to the sectors, said plates made of dissimilar conducting materials with dissimilar work functions for creating an electric field in a portion of the space between the two plates, a diametral conductor mounted on the base having a brush at each end thereof for sequentially connecting opposite sectors as said sectors pass through the electric field, two collecting brushes, each connected to a stator plate for collecting electrical charges from the sectors, and output terminals connected to the stator plates for applying electrical power to a load circuit.

7. An electrostatic voltage generator comprising, a base member, an insulating disk rotatably mounted on the base, a plurality of conducting sectors secured to the periphery of the disk in spaced arrangement and insulated from each other, two stator plates mounted on the base adjacent to the sectors, said plates made of dissimilar conducting materials with dissimilar work functions for creating an electric field in a portion of the space between the two plates, a diametral conductor mounted on the base having a brush at each end thereof for sequentially connecting opposite sectors as said sectors pass through the electric field, two stator collecting brushes, each connected to a stator plate for collecting electrical charges from the sectors, and two output brushes mounted so as to make contact with the rotating sectors for collecting charges from the sectors and making them available to a load circuit.

8. An electrostatic voltage generator comprising, a base member, a rotatable insulating support, conducting sectors mounted on said support, two stator plates made of conducting material differing from the sector material and having a work function which is substantially different from the work function of the sector material, said stator plates mounted on the base adjacent to the rotatable sectors and arranged to produce field strengths differing from each other, a diametral conductor mounted on the base having a brush at each end thereof for sequentially connecting opposite sectors as said sectors pass through the electric field between the stator plates, and two collecting brushes, each connected to a stator plate, for collecting electrical charges from the sectors.

9. An electrostatic voltage generator comprising, a base member, a rotatable insulating support, conducting sectors mounted on said support, two stator plates made of conducting material differing from the sector material and having a work function which is substantially different from the work function of the sector material, said stator plates mounted on the base adjacent to the rotatable sectors, one of said stator plates positioned substantially closer to the sectors than the second of said plates, whereby the field strength produced between one plate and the sectors is substantially different from the field strength produced between the second plate and the sectors, a diametral conductor mounted on the base having a brush at each end thereof for sequentially connecting opposite sectors as said sectors pass through the electric field between the stator plates, and two collecting brushes, each connected to a stator plate, for collecting electrical charges from the sectors.

CARL BOSCH.

REFERENCES CITED

The following references are of record in the file of this patent:

UNITED STATES PATENTS

| Number | Name | Date |
| --- | --- | --- |
| 2,523,689 | Felici | Sept. 26, 1950 |